UNITED STATES PATENT OFFICE.

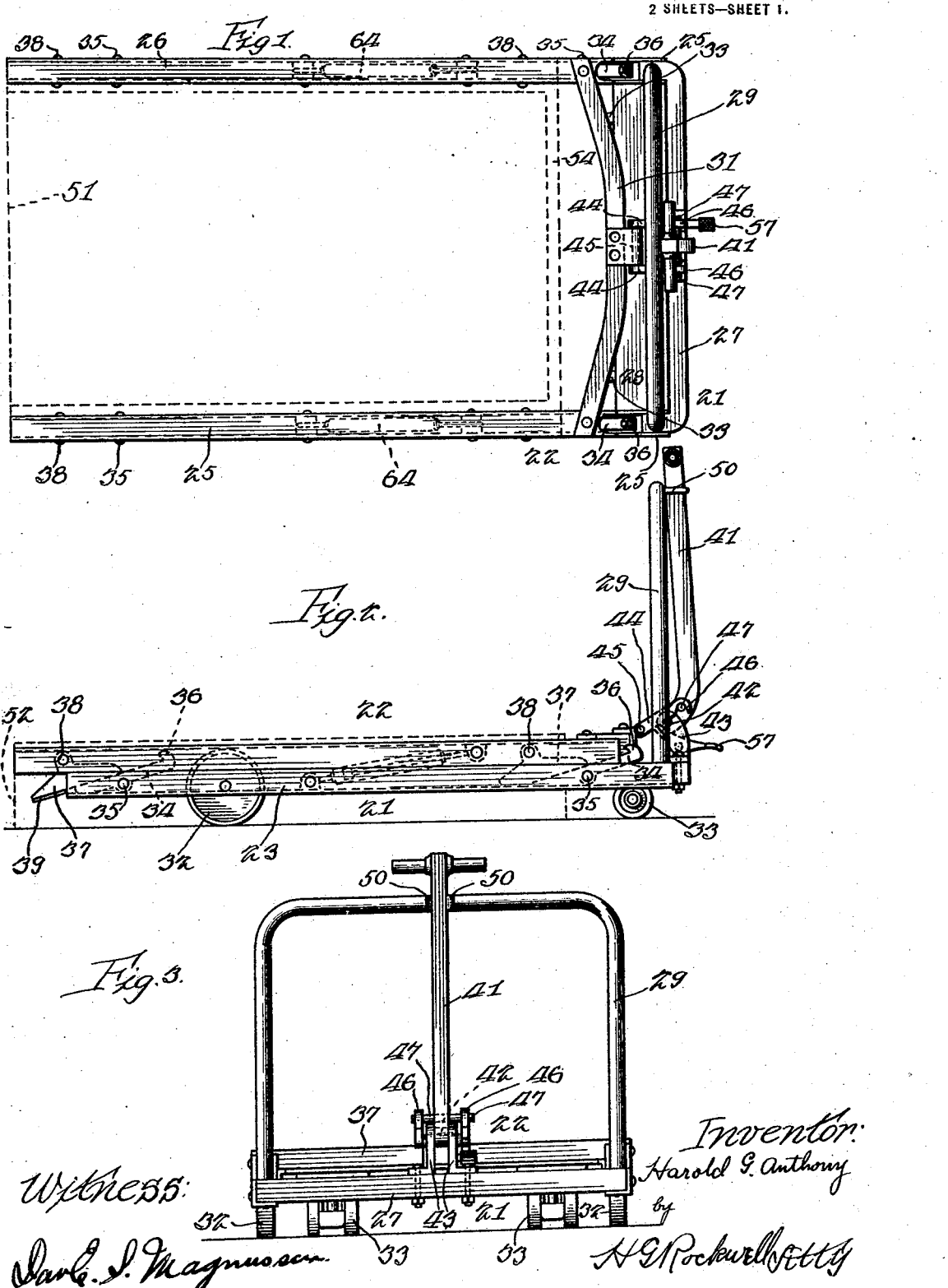

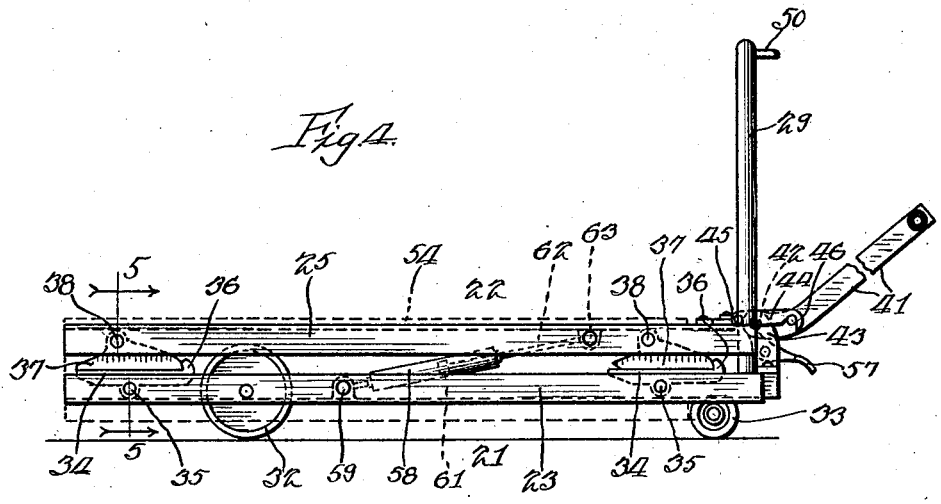
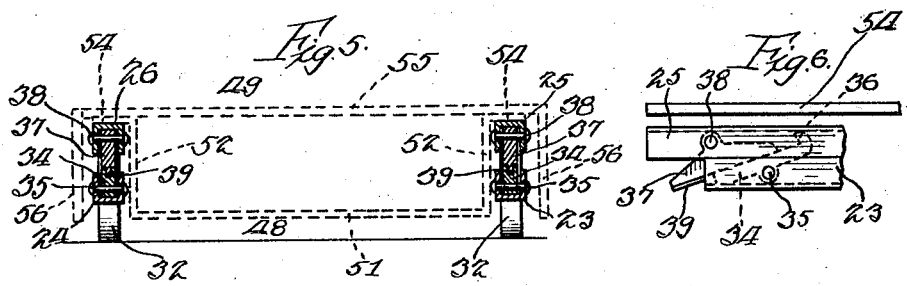
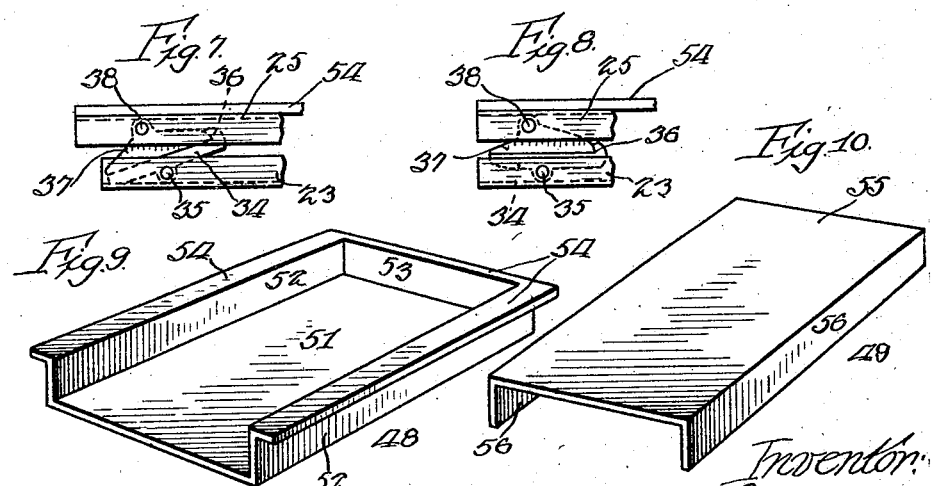

HAROLD G. ANTHONY, OF CHICAGO, ILLINOIS.

COMBINATION FLOOR AND PLATFORM TRUCK.

1,414,163. Specification of Letters Patent. Patented Apr. 25, 1922.

Application filed May 12, 1920. Serial No. 380,810.

*To all whom it may concern:*

Be it known that I, HAROLD G. ANTHONY, a citizen of the United States, and a resident of Chicago, in the county of Cook and State of Illinois, have invented certain new and useful Improvements in Combination Floor and Platform Trucks, of which the following is a specification.

My invention relates to combination floor and platform trucks and has for its primary object the provision of improved means for actuating said trucks in their function of raising from and lowering upon the floor a load to be conveyed by means of the truck, said means being particularly designed to minimize the amount of energy required in elevating a load from the floor and in lowering the same gently on to the floor. A further object lies in the provision of a skeleton truck by means of which various types of load carrying devices may be elevated, transported and deposited. Another object is to provide such a skeleton truck with a permanently attached body the supporting deck of which normally lies flush upon the floor, the combined truck and floor body being arranged so that the ordinary elevated platform body may be elevated, transported and deposited even though the floor body remains a part of the truck.

Other objects and advantages of the invention will appear from the following description taken in conjunction with the accompanying drawings which form a part of this specification and illustrate the preferred embodiment of my invention.

In the drawings:

Fig. 1 is a top plan view of the present invention, showing in dotted lines a floor body mounted thereon.

Fig. 2 is a side elevation thereof.

Fig. 3 is an end elevation of the invention.

Fig. 4 is a view similar to Fig. 2 showing the elevated position of the parts.

Fig. 5 is a section taken on line 5—5 of Fig. 4.

Figs. 6, 7 and 8 are fragmentary details illustrating three successive positions of parts of the invention during the elevation of the upper frame of the truck.

Fig. 9 is a perspective view of a floor body for the present invention.

Fig. 10 is a perspective view of a platform body therefor on a scale slightly reduced from that of Fig. 9.

Reference numerals 21 and 22 indicate generally the lower and upper frames respectively of the present invention. These frames are U-shaped in plan view and comprise legs of channel-iron, those of the lower frame having their concavities upwardly exposed and those of the upper frame being superposed above the lower frame legs with their concavities inwardly exposed to permit the positioning within the respective legs of operating mechanism to be described. The legs of the lower frame are for convenience respectively numbered 23 and 24 while those of the upper frame are respectively numbered 25 and 26. The forward ends of the lower frame are connected by a cross reach 27 as well as a brace 28, while the forward ends of the upper frame legs have their horizontal upper webs slotted to accommodate the vertical portions of an inverted U-shaped hand rail 29 upstanding from the lower frame.
Just to the rear of these upper frame slots, and consequently near their forward ends the upper legs 25 and 26 are connected by a cross bar 31. The apparatus so far described is made readily movable by a pair of rear wheels 32 mounted on short alined axes fixed in the respective lower frame legs 23 and 24 near the rear of the truck, while a pair of casters 33 support the forward end of the truck and are preferably connected to the brace 28.

Front and rear shoes 34 are provided in each lower frame leg 23 and 24, these shoes being pivotally mounted within the channel iron on axes 35. The forward end of each shoe is upturned to form a stop 36. For each of the four shoes of the lower frame a slide block 37 is provided, pivoted in and depending from the upper frame legs 25 and 26 on axes 38. The slide blocks rest and slide upon their respective shoes, and the upper frame of the truck is held against sidewise movement upon the lower one by a forwardly and rearwardly elongated tongue and groove connection 39 best seen in Figs. 2, 5 and 6. Inasmuch as the pivot 38 is in each instance positioned rearwardly of the vertical line passing through pivot 35, the upper truck frame 22 has a constant, gravity induced tendency to descend from the elevated position of Figs.

4, 5 and 8 to the lowered position shown in Figs. 1, 2, 3 and 6, in which latter position its rests upon the lower frame 21.

Actuating means for elevating and lowering the upper frame, and any load carried thereby, are provided in a hand lever 41 pivoted as at 42 in the upper ends of a pair of brackets 43 upstanding from the cross-reach 27 of the lower truck frame. A double hook 44 is pivoted at 45 to the crossbar 31 of the upper truck frame and is adapted to have its free hooked ends 46 releasably hooked over studs 47 which project laterally from the lower portion of lever 41. In the normal or lowered position of the upper frame 22, the lever 41 is drawn against the forward side of the hand rail 29 and between spaced spring clips 50, as shown in Figs. 1 and 2, and it moves forwardly and downwardly to the position of Fig. 4 in elevating the upper frame.

In Fig. 9 is shown what I term a floor body 48 for the truck hereinabove described, while Fig. 10 illustrates a platform body 49 therefor. The floor body is preferably a single steel casting comprising a load receiving bed 51 normally resting flatly on the floor; upstanding sides 52; a forward upright end 53; and a horizontal out-turned flange 54 extending around the sides and one end. The rear end of the floor body 48 is open to permit the shifting of heavy articles upon bed 51 with the minimum elevation of such articles during the loading of the floor body. The floor body, exclusive of flange 54, is of such width as to be readily received between the parallel sides (23 and 25 on the right and 24 and 26 on the left) of the skeleton truck above described, and flange 54 is at such height from the floor as to overlie the top of upper frame 22 when the latter is in lowered position—see Fig. 2. The platform body 49 comprises a horizontal receiving deck 55 held above the floor by parallel side uprights 56 at a height sufficient to permit the lowered upper frame 22 to run beneath it. The skeleton truck shown in Figs. 1 to 4 may, if desired, have permanently attached to it the floor body 48, and the uprights 56 of the platform body 49 are preferably of sufficient height to permit the skeleton truck as well as the permanently attached floor body to be readily rolled beneath the deck 55. This arrangement is indicated in Fig. 5, where the floor body 48 is shown as it would appear when permanently attached to the upper truck frame; and where the platform body 49 is also shown as resting upon the flange 54 of the floor platform. The uprights 56 of the platform body are, however, so limited in height that, while they will permit of the arrangement just above mentioned, and of being elevated from the floor while resting upon the flanges 54, the platform body may nevertheless be elevated from the floor by the skeleton truck alone without the interposition of a permanently attached floor body.

In the operation of the invention, a load of goods to be moved is placed upon the bed 51 of the floor body. The upper frame of the skeleton truck is now lowered till the lower edges of its side channels rest upon the upper edges of the side channels of the lower frame as best seen in Figs. 2 and 6. In this position of the parts the hand lever 41 is in the upright position shown in Figs. 1, 2 and 3. Grasping the hand rail, the operator backs the skeleton truck toward the closed forward end of the floor platform, causing the legs of the U-shaped skeleton truck to pass beneath the longitudinal or side portions of flange 54. The operator now depresses the hand lever 41 to the position shown in Fig. 4 thereby elevating the floor platform and its load from the floor, so that they are free to be rolled about on the truck itself. An important feature of the present invention lies in the action of the shoes 34 and their companion elevating members,—the slide blocks 37. This action is illustrated in Figs. 6, 7 and 8. When the legs of the truck have been positioned beneath the flange 54, there may be some slight space between the bottom of the flange 54 and the top surface of the upper truck frame 22; in fact there is preferably such a space in order that the truck may be readily positioned beneath the flange. This space is indicated by the relative positions of the upper frame legs 25 and the flange 54 in Fig. 6. During the first operation of the downward movement of lever 41, the blocks 37 slide obliquely forward and upward upon the shoes 34 to take up this space and bring the upper frame against the lower surface of the flange 54. This latter position of the parts is illustrated in Fig. 7, wherein it is also seen that the forward end of block 37 has impinged against the stop 36 which is an integral portion of the shoe 34. This same action has of course taken place in all four sets of slide block and shoe. Further downward and forward movement of the lever 41 causes the now relatively fixed slide blocks and shoes to tilt about their respective axes 38 and 35, so that the actual elevation of the floor body and its load is accomplished by a pivotal movement of the blocks and shoes in their respective frames. Because of the partial elevation of pivot 38 from its lowest position, the actual raising of the load to the highest position, as indicated in Fig. 8, is accomplished much more readily by the pivotal movement of the parts than it would be by the sliding movement occurring between the positions of Figs. 6 and 7. But the forward and upward obliquely sliding movement of the blocks upon their shoes before the weight of the load is assumed on the skeleton truck reduces to a minimum the leverage force required to elevate the upper frame of the truck from the position of Fig. 6 to that of Fig. 7. Were the pivots 35 and 38 to be connected by a stiff link mounted by its ends on these pivots, greater force would be required to accomplish this first partial elevation of the upper frame into contact with the flange 54. The position of Fig. 8 illustrates the highest elevation of the upper frame from the lower, but it will be noted that pivots 35 and 38 are not in vertical alinement, but that 38 stands rearwardly of 35 so that the upper frame and its load have a constant gravity induced tendency to drop back into the position of Fig. 6. This tendency is overcome by a spring catch on the upper frame snapping over a lug on the lower frame, releasing the hooks on the handle allowing a free movement of handle 41 to steer truck with its floor body and load to any desired point.

In depositing the floor body and its load at the desired location the operator may, if he desires, lower the load by releasing the spring catch with the foot trip pedal 57 allowing the load to descend by gravity, but if this is resorted to the precise positioning of the floor body and its load in the location desired is not so accurate as that which I have provided for. In depositing the body and load I prefer to hold the lower frame fixedly in position where it stands, and, by means of a pedal 57, to trip the hooks 44 from studs 47, thus suddenly releasing the upper frame, the body, and the load to the action of gravity. To prevent undue shock to these latter elements I provide an air cushion device consisting of a cylinder 58 having its lower closed end pivoted as at 59 to the lower frame; a piston 61 positioned in the ordinary manner in the forwardly directed open end of the cylinder; and a piston rod 62 extending forwardly of the cylinder and pivoted as at 63 to the upper frame. If found convenient, I may employ two of these air cushioning devices as generally indicated at 64 in Fig. 1, one at each side of the truck. The action of this air cushioning device is to cushion the fall of the upper frame and its load so that the floor body, or the platform body, as the case may be, will drop gradually and without jar from elevated to lowered position, in which latter the platform and load are supported upon the floor.

The use of the skeleton truck in connection with the platform body 49 is so similar to its action as related to the floor body 48 as to be readily understood without long description. The skeleton body in the lowered position of Fig. 2 is backed between the uprights 56 and below the deck 55 following which it and its load are elevated and dropped precisely in the manner above described with respect to the floor body.

I claim:

1. In a truck, the combination with relatively movable lower and upper frames, of a plurality of shoes pivotally mounted on said lower frame, a slide block for each of said shoes pivotally mounted in said upper frame, said blocks being arranged to slide upon said shoes in a common oblique direction, and means for causing relative movement between said frames.

2. In a truck, the combination with relatively movable lower and upper frames, of a plurality of shoes pivotally mounted on said lower frame, a slide block for each of said shoes pivotally mounted in said upper frame, said blocks being arranged to slide upon said shoes in a common oblique direction, stops limiting the upward movement of the blocks on the shoes, and means for causing limited relative movement between said frames.

3. In a truck, the combination with relatively movable lower and upper frames, of a plurality of shoes pivotally mounted on said lower frame, a slide block for each of said shoes pivotally mounted in said upper frame, said blocks being arranged to slide upon said shoes in a common oblique direction, stops limiting the upward movement of the blocks on the shoes, and means for causing limited relative movement between said frames, said blocks and shoes being joined in a tongue and groove connection elongated in the direction of relative movement of said frame members.

4. In a truck, the combination with relatively movable lower and upper frames, of a plurality of shoes pivotally mounted on said lower frame, a slide block for each of said shoes pivotally mounted in said upper frame, said blocks being arranged to slide upon said shoes in a common oblique direction, stops limiting the upward movement of the blocks on the shoes, and means for causing limited relative movement between said frames, the pivoted axes of said blocks being, in all positions of the parts, located rearwardly of the pivoted axes of said shoes.

5. In a truck, the combination with relatively movable lower and upper frames, and means for relatively actuating the same to a limited extent, of devices interposed between said frames whereby the latter slide one upon the other during a portion of their relative movement and move pivotally one upon the other during the remainder of said relative movement.

6. In a truck, the combination with relatively movable lower and upper frames, and means for causing limited relative movement therebetween of a plurality of shoes pivotally mounted in the lower frame, a slide block for each shoe pivotally mounted in the upper frame, the axes of said blocks being located rearwardly of the axes of said shoes, said shoes and blocks being mounted to slide one upon the other during a portion of the relative movement of the frames; and a stop arranged to arrest said sliding movement before the termination of the relative movement of said frames.

7. In a truck, the combination of a U-shaped frame, comprising upper and lower members, each channel shaped in cross section and superposed one upon the other with the open sides of the channels in opposed relation, cooperating means pivoted in the channels of said respective members whereby the upper member will be raised relatively to the lower upon relative longitudinal movement between said members, wheels disposed beneath the upper plane of the frame upon which said frame is carried, and means for causing a relative movement between said members, said frame being adapted to straddle and to be rolled beneath an object to be carried and to lift said object by relative movement between said members.

8. In a truck, the combination of a U-shaped frame comprising upper and lower members, each channel shaped in cross section, said members being disposed one above the other with the open faces of the channels in opposed relation, means pivotally mounted in said channels whereby the upper member is raised relatively to the lower upon relative longitudinal movement between said members, carrying wheels disposed beneath the plane of the top of said upper member so that the truck may be bodily rolled beneath a lateral projection disposed in proximity to the floor and extending laterally from an object to be moved, and means for causing a relative movement between said members whereby said upper member is elevated with respect to the lower to thereby lift and carry said object.

9. In a truck, the combination of a U-shaped horizontal frame adapted to straddle an object to be lifted and transported and comprising upper and lower correspondingly shaped relatively movable members, carrying wheels mounted on the lower member and disposed entirely beneath the plane of the top of the frame, means pivotally mounted upon the respective members in cooperative relation to lift the upper member relatively to the lower upon relative longitudinal movement between said members, and means for imparting a relative longitudinal movement to said members.

10. In a truck, the combination of a lower frame comprising channel iron side members having the channels opening upwardly, an upper frame superposed upon said lower frame and comprising channel iron side members with the channels opening downwardly, and means pivotally mounted in opposed relation in the channels of said respective frames whereby the upper frame may be elevated relatively to the lower frame upon longitudinal movement between said frames.

HAROLD G. ANTHONY.